United States Patent Office
2,918,451
Patented Dec. 22, 1959

2,918,451

STABILIZATION OF HALOGENATED HYDROCARBON RESINS

Stanley B. Elliott, Bedford, Ohio, assignor to Ferro Corporation, Cleveland, Ohio, a corporation of Ohio No Drawing. Application September 25, 1957
Serial No. 686,038

1 Claim. (Cl. 260—45.75)

This invention relates to new compositions of matter and more particularly to compositions which make halogenated hydrocarbons resistant to the degradation effects of heat and/or light.

The present invention is a continuation-in-part of my present application bearing Serial No. 402,139, dated January 4, 1954, now abandoned.

It is well known to those skilled in the art that severe exposure of such resinous materials as chlorinated paraffins, polyvinyl chloride, polyvinylidene chloride and copolymers to heat and/or light brings about discoloration, brittleness and loss of strength. This degradation is especially pronounced during the various fabrication processes these resinous materials are subjected, such as injection molding, calendering, etc.; operations which require heating.

It is my theory that the degradation of these halogenated hydrocarbons occurs through several different chemical mechanisms, such as evolution of HCl, free radical formation and depolymerization. While there are innumerable stabilizers in the prior art, such as organic lead salts, alkaline earth salts, etc., no one of these prior art materials has satisfactorily overcome the degradation problem.

It is, therefore, the principal object of the present invention to provide stabilizing agents for halogenated hydrocarbons which are superior to those of the prior art.

A further object of this invention is to provide stabilizing agents which make halogenated hydrocarbons resistant to sulfur staining.

A still further object of this invention is to provide stabilizing agents which are economical and easy to incorporate into halogen containing hydrocarbon resins.

Other objects will become apparent as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention, may be employed.

Broadly stated this invention comprises a stabilizer for halogenated hydrocarbon resins comprising an intimate admixture of a colorless Friedel-Crafts catalyst cation progenitor, a primary aliphatic polyhydric alcohol having at least three hydroxyl groups of which at least two hydroxyl groups are free and a boiling point not less than 250° F. and a hydrogen chloride acceptor.

As is well known to those skilled in the art, that while aluminum is the best known of the Friedel-Crafts cations, many other cations are also known and used. Among those that may be listed as the more important Friedel-Crafts cations are aluminum, antimony, zinc, tin, titanium, zirconium, beryllium, boron, cadmium and bismuth. It will be noted that in the foregoing enumeration of Friedel-Crafts cations, iron has been omitted. Since one of the objects of this invention is the retention of the original color or colorless condition of the resin involved, iron cannot be used. Iron being a material of high coloring properties would tend to discolor the resin being stabilized and thus defeat the purpose of the invention. So as to clearly define and establish what is meant by a Friedel-Crafts cation progenitor the following explanation is given. The Friedel-Crafts catalyst cation progenitors are the inorganic hydrates, oxides, carbonates, alcoholates and any organic salts, which contain any of the above mentioned cations and which in the presence of halide ions will form Friedel-Crafts type catalysts by reaction with the halide ions or which in the presence of halogen free radicals such as formed during the decomposition of halogenated polymers will form Friedel-Crafts catalysts. The Friedel-Crafts cation progenitor compounds are illustrative of materials which have been found to be especially useful in the present invention:

Zinc oxide
Zinc hydroxide
Zinc carbonate
Zinc acetate
Zinc laurate
Zinc naphthenate
Zinc stearate
Zinc oleate
Zinc 2-ethyl-hexoate
Cadmium oxide
Cadmium hydroxide
Cadmium carbonate
Cadmium acetate
Cadmium laurate
Cadmium naphthenate
Cadmium stearate
Cadmium oleate
Cadmium 2-ethyl-hexoate
Aluminum oxide
Aluminum hydroxide
Aluminum carbonate
Aluminum acetate
Aluminum chlorolaurate
Antimony oxide
Antimony hydroxide
Antimony carbonate
Antimony naphthenate
Tin oxide
Tin hydroxide
Tin carbonate
Tin naphthenate
Tin 2-ethyl-hexoate As previously defined the polyhydric alcohols which are applicable to the present invention must be primary aliphatic alcohols having at least three hydroxyl groups of which two hydroxyl groups are free and have a boiling point not less than 250° F.

By intensive study I have found that alcohols having secondary or tertiary OH groups are only moderately successful or completely unsuccessful in the stabilizer compositions of this invention. Even alcohols having some primary OH groups along with secondary and tertiary OH groups are undesirable. Therefore, it cannot be emphasized too strongly that the compositions of this invention are intended only to include those aliphatic polyhydric alcohols having at least three primary OH groups of which two of the OH groups must be free. Further, since halogenated hydrocarbon resins are processed at from 250° F. to about 350° F. it is necessary that the primary polyhydric alcohols used must be able to withstand processing temperatures without boiling off. Therefore, the primary polyhydric alcohols must have a boiling point of at least 250° F.

It is also within the contemplation of this invention to use alcohols, as defined above, having ether or ester groups attached thereto, however, the alcohol having an ether or ester group must have at least two free primary OH groups and the alcohol before esterification or etherification must have had a total of at least three OH groups.

Some primary aliphatic polyhydric compounds which have been found particularly useful in this invention are as follows:

Trimethylolethane
Trimethylolpropane
Tetramethylolcyclohexanol
Pentaerythritol
Dipentaerythritol
Tripentaerythritol It is of importance to note here that the above disclosed primary aliphatic polyhydric alcohols may also be used in the form of metal alcoholates. That is, all of the hydroxyl groups of the alcohols may be reacted partially or entirely with a metal. The metal alcoholates in the presence of hydrogen halides will readily release their metal cations to form polyhydric alcohols with free hydroxyl groups and metal halides. Thus it will readily be seen that a polyhydric metal alcoholate can be used as both the source of the polyhydric alcohol and the Friedel-Crafts type catalyst cation progenitor.

While the polyhydric alcohol is necessary in order to effectively stabilize a resin, from the foregoing it will be seen that a metal alcoholate can be used, since the polyhydric alcohol with free OH groups will be formed in situ.

The oxides, hydrates and carbonates of the alkaline earth metals, the alkaline earth metal soaps, the oxide, hydrates and carbonates of lead, the lead soaps, 1,2-epoxy compounds having a boiling point not less than 250° F. and metal alcoholates are HCl acceptors which can be combined with the aforementioned stabilizers to produce a synergistic effect which makes the mixtures outstanding as stabilizing agents. As discussed before the metal alcoholates may be used as a source of the primary polyhydric alcohol and the metal cations. In this instance the metal alcoholates may be used to supply the hydrogen halide acceptor metals.

The ingredients of the present stabilizer are intimately admixed in proportions of from 0.05 to 100 parts of Friedel-Crafts catalyst cation progenitol per 100 parts of polyhydric alcohol and from 5–1000 parts of hydrogen chloride acceptor per 100 parts of cation progenitor and alcohol.

The stabilizer may be used in halogenated hydrocarbon resins in the ratio of 0.5% to 10% per 100 parts of resin.

As stated above, degradation of halogenated hydrocarbon resins occurs through several different chemical mechanisms. It is my theory that the Friedel-Crafts catalyst formed by the reaction of a progenitor and a halide, catalyzes the reaction between the primary polyhydric alcohol and the free radicals formed by the degradation of the resin and hydrogen chloride acceptors present in the composition prevent free HCl. Nevertheless, regardless of the theory I have found a synergism does exist between the Friedel-Crafts catalysts, primary polyhydric alcohol and the hydrogen chloride acceptors.

So that the present invention may be more clearly understood the following examples are offered as being illustrative of the invention:

I

| | Percent |
|---|---|
| Zinc oxide | 7 |
| Barium oxide | 27 |
| Pentaerythritol | 66 |

II

| | |
|---|---|
| Tin oxide | 20 |
| Barium oxide | 23 |
| Tripentaerythritol | 57 |

III

| | |
|---|---|
| Zinc oxide | 7 |
| Basic lead carbonate | 27 |
| Trimethylolpropane | 66 |

The following examples illustrate the stabilizers of this invention in combination with a halogenated hydrocarbon resin. In the following examples standard compositions comprising 100 parts of polyvinyl chloride polymer, 45 parts plasticizer (dioctylphthalate), 2 parts lubricant (stearic acid) were thoroughly mixed:

IV

To one portion of the above composition no stabilizer was added. To a second equal amount of such composition was added 0.5 part of barium oxide. To a third portion of the above composition there was added 0.5 part barium oxide and 0.16 part zinc oxide. To a fourth portion of the composition there was added 0.16 part zinc oxide and 1.6 parts pentaerythritol. To a fifth portion was added 0.5 part barium oxide, 0.16 part zinc oxide and 1.6 parts pentaerythritol. All the compositions were then milled on a two roll mill at 350° F. The following results were noted.

A. The composition containing no stabilizer turned dark yellowish brown at 20 minutes.

B. The composition containing 0.5 part barium oxide turned dark orange at 20 minutes.

C. The composition containing the 0.5 part barium oxide and 0.16 part zinc oxide turned black and spongy at 20 minutes.

D. The composition containing the 0.16 part zinc oxide and 1.6 parts pentaerythritol turned dark yellow at 60 minutes.

E. The composition containing the 0.5 part barium oxide, 0.16 part zinc oxide and 1.6 parts pentaerythritol turned only a very pale yellow at 60 minutes. This result clearly establishes the synergism obtained with the hydrogen chloride acceptor (barium oxide), Friedel-Crafts, and polyhydric alcohol system.

V

The same procedure as in Example IV was followed except that 0.15 part of cadmium oxide were used as the Friedel-Crafts material.

A. The composition with no stabilizer turned dark brown at 20 minutes.

B. The composition containing the 0.5 part barium oxide turned dark orange at 20 minutes.

C. The composition containing the 0.5 part barium oxide and 0.15 part cadmium oxide turned black at 20 minutes.

D. The composition containing the 0.15 cadmium oxide and 1.6 parts pentaerythritol turned dark yellow at 60 minutes.

E. The composition containing the 0.15 part cadmium oxide, 0.5 part barium oxide and 1.6 parts pentaerythritol turned only a very pale yellow at 60 minutes. Thus again demonstrating the outstanding effect of the synergism obtained with the Friedel-Crafts, polyhydric alcohol and hydrogen chloride acceptor stabilizer system.

VI

The same procedure as in Example V was followed except that 0.2 part antimony oxide was used as the Friedel-Crafts catalyst.

A. The results showed the same as V–A.

B. The results showed the same as V–B.

C. The results showed the same as V–C.

D. The composition containing the 0.2 part antimony oxide and 1.6 parts pentaerythritol turned dark yellow at 30 minutes.

E. The composition containing the 0.2 part antimony oxide, 0.5 part barium oxide and 1.6 parts pentaerythritol turned pale yellow at 30 minutes. The synergistic effect is here again strongly demonstrated.

VII

The same procedure as in Example IV was followed except that 0.5 part of the condensation product of epichlorohydrin and bisphenol was substituted for the barium oxide as the hydrogen chloride acceptor.

A. The composition with no stabilizer turned dark brown at 20 minutes.

B. The composition containing the 0.5 part of the condensation product of epichlorohydrin and bisphenol turned brown at 20 minutes.

C. The composition containing the 0.5 part of the condensation product of epichlorohydrin and bisphenol and 0.16 part of zinc oxide turned black at 20 minutes.

D. The composition containing 0.16 part of zinc oxide and 1.6 parts of pentaerythritol turned dark yellow at 60 minutes.

E. The composition containing 0.5 part of the condensation product of epichlorohydrin and bisphenol, 1.6 parts of pentaerythritol and 0.16 part of zinc oxide turned a pale yellow at 60 minutes.

VIII

This example is given to demonstrate the use of a metal alcoholate.

Two parts of pentaerythritol were reacted with .36 part of BaO to form about 2.32 parts of barium alcoholate. The barium alcoholate was then admixed with .12 part of a Friedel-Crafts cation progenitor (ZnO). The stabilizer was then admixed with the standard resin composition as used in the foregoing examples.

The stabilized resin when heated at 350° F. (as were the foregoing examples) turned a very pale yellow after 60 minutes. Thus demonstrating the effectiveness of the Friedel-Crafts, polyhydric alcohol and hydrogen halide acceptor stabilizing system.

The stabilizing agents may be incorporated by a number of methods. They may be added to the solid resin and mixed therein by means of hot rolls or other mixing machines adapted to mix solid resins. They may also be dispersed in a suitable liquid and then mixed with the resin, or the dispersion of the stabilizer may be mixed with a solution of the resin. The only important requisite is that the stabilizers and resin are thoroughly mixed and dispersion is as complete as possible.

As is well known, vinyls degrade through chain type decomposition with a relatively large concentration of highly active free radicals being formed in the process. Since the stabilizers of this invention have effective free radical terminating abilities, the free radical attack on many sensitive organic pigments, which leads to bleaching or other color changes is eliminated.

From the foregoing discussion it will be readily seen that the stabilizers of the present invention are easily made, are comprised of relatively cheap ingredients, are compatible with pigments and above all give stabilization superior to prior art materials. It may also be noted that the use of antimony as the Friedel-Crafts material in addition to stabilizing the halogenated hydrocarbon resins will afford flame proofing properties.

Other modes of applying the principle of the invention may be employed change being made as regards to details described, provided the features stated in any of the following claim or the equivalent of such be employed.

I, therefore, particularly point out and distinctly claim as my invention:

A composition of matter comprising a halogenated vinyl resin and from 0.5% to 10% per 100 parts of said resin of a stabilizer, said stabilizer comprising an intimate admixture of pentaerythritol, 0.05 to 100 parts of zinc oxide per 100 parts of pentaerythritol and from 5 to 1000 parts of barium oxide per 100 parts of said pentaerythritol and said zinc oxide.

References Cited in the file of this patent
UNITED STATES PATENTS

| | | |
|---|---|---|
| 2,711,401 | Lally | June 21, 1955 |
| 2,777,826 | Olson | Jan. 15, 1957 |